United States Patent
Espinosa et al.

(10) Patent No.: US 10,255,449 B2
(45) Date of Patent: Apr. 9, 2019

(54) PERMISSION REQUEST

(71) Applicant: Apple Inc., Cupertino, CA (US)

(72) Inventors: Christopher D. Espinosa, Menlo Park, CA (US); Christopher John Sanders, San Jose, CA (US); David L. Neumann, Lake Oswego, CA (US); Gregory Quirk, Maple Glen, PA (US); James C. Wilson, Santa Clara, CA (US); Maria D. Ioveva, Menlo Park, CA (US); Michael Chu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 637 days.

(21) Appl. No.: 14/529,659

(22) Filed: Oct. 31, 2014

(65) Prior Publication Data

US 2015/0347769 A1     Dec. 3, 2015

Related U.S. Application Data

(60) Provisional application No. 62/005,187, filed on May 30, 2014, provisional application No. 62/005,180, filed on May 30, 2014.

(51) Int. Cl.
*G06F 21/00* (2013.01)
*G06F 21/62* (2013.01)
(Continued)

(52) U.S. Cl.
CPC ............ *G06F 21/62* (2013.01); *H04L 63/104* (2013.01); *H04L 63/168* (2013.01); *H04W 12/08* (2013.01)

(58) Field of Classification Search
CPC ...... G06F 21/62; H04W 12/08; H04L 63/104; H04L 63/168
See application file for complete search history.

(56) References Cited

U.S. PATENT DOCUMENTS 6,609,113 B1   8/2003   O'Leary et al.
7,058,708 B2   6/2006   Gold et al.
(Continued)

FOREIGN PATENT DOCUMENTS

TW    200707229    2/2007
TW    200928747    7/2009
(Continued)

OTHER PUBLICATIONS

International Search Report and Written Opinion from PCT Application No. PCT/2015/029478 dated Jul. 20, 2015.
(Continued)

*Primary Examiner* — Mahfuzur Rahman
(74) *Attorney, Agent, or Firm* — Blank Rome LLP

(57) ABSTRACT

To perform a restricted action, such as access a restricted content item, a subordinate user account can transmit a permission request to an authorizing user account. The permission request can request authorization from the authorizing user account to perform the restricted action. The permission request can be transmitted to one or more client devices of the authorizing user account, and enable to the authorizing user account to remotely select to approve or deny the permission request, thereby either granting or denying the subordinate user account from performing the restricted action. In addition to approving or denying a permission request, an authorizing user account can also be enabled to ignore a permission request, thereby allowing the authorizing user account to respond to the permission request at a later time. Further, in some embodiments, an authorizing user account can select to deny all further permission requests to perform the restricted action.

19 Claims, 5 Drawing Sheets

(51) Int. Cl.
*H04L 29/06* (2006.01)
*H04W 12/08* (2009.01)

(56) References Cited

U.S. PATENT DOCUMENTS

| | | | |
|---|---|---|---|
| 7,171,554 B2* | 1/2007 | Sahlbach | H04L 9/3263 |
| | | | 380/257 |
| 7,433,710 B2 | 10/2008 | Bodnar et al. | |
| 7,493,374 B2 | 2/2009 | Cross et al. | |
| 7,827,247 B1 | 11/2010 | Spertus et al. | |
| 8,332,314 B2 | 12/2012 | Griffin | |
| 8,346,953 B1* | 1/2013 | Hew | H04L 63/10 |
| | | | 709/201 |
| 8,459,544 B2 | 6/2013 | Casey et al. | |
| 8,478,734 B2 | 7/2013 | Niejaklik | |
| 8,662,384 B2 | 3/2014 | Dodin | |
| 8,699,998 B2 | 4/2014 | Sprigg et al. | |
| 9,246,875 B2* | 1/2016 | Mityagin | H04L 63/0263 |
| 2002/0049806 A1 | 4/2002 | Gatz et al. | |
| 2003/0208442 A1 | 11/2003 | Cockrill et al. | |
| 2005/0044229 A1* | 2/2005 | Brown | H04L 67/322 |
| | | | 709/226 |
| 2005/0060542 A1* | 3/2005 | Risan | G06F 21/10 |
| | | | 713/165 |
| 2007/0006177 A1* | 1/2007 | Aiber | G06Q 10/10 |
| | | | 717/136 |
| 2008/0134295 A1 | 6/2008 | Bailey et al. | |
| 2008/0140569 A1 | 6/2008 | Handel | |
| 2009/0178132 A1 | 7/2009 | Hudis et al. | |
| 2009/0217356 A1* | 8/2009 | Scott | G06F 21/604 |
| | | | 726/4 |
| 2009/0313665 A1* | 12/2009 | Rouse | H04N 7/1675 |
| | | | 725/93 |
| 2011/0047629 A1 | 2/2011 | Mitchell et al. | |
| 2011/0191209 A1 | 8/2011 | Gould et al. | |
| 2011/0288946 A1* | 11/2011 | Baiya | G06F 21/10 |
| | | | 705/26.1 |
| 2012/0173356 A1 | 7/2012 | Fan et al. | |
| 2012/0226780 A1 | 9/2012 | Knight et al. | |
| 2012/0278233 A1 | 11/2012 | Webber et al. | |
| 2012/0324504 A1 | 12/2012 | Archer et al. | |
| 2013/0017806 A1* | 1/2013 | Sprigg | H04M 1/66 |
| | | | 455/411 |
| 2013/0082819 A1 | 4/2013 | Cotterill | |
| 2013/0104246 A1 | 4/2013 | Bear et al. | |
| 2013/0110716 A1 | 5/2013 | Rekhi et al. | |
| 2013/0110720 A1 | 5/2013 | Rekhi et al. | |
| 2013/0260721 A1 | 10/2013 | Carney et al. | |
| 2014/0044258 A1 | 2/2014 | Grewal et al. | |
| 2014/0150068 A1 | 5/2014 | Janzer | |
| 2015/0242611 A1 | 8/2015 | Cotterill et al. | |

FOREIGN PATENT DOCUMENTS

| | | |
|---|---|---|
| TW | 201308237 | 2/2013 |
| TW | 201332332 | 8/2013 |
| WO | 2010/035281 | 4/2010 |

OTHER PUBLICATIONS

International Search Report and Written Opinion from PCT Application No. PCT/2014/066958 dated Feb. 20, 2015.

International Preliminary Report on Patentability from PCT Application No. PCT/US2014/066958 dated Jun. 9, 2016.

International Preliminary Report on Patentability from PCT Application No. PCT/2015/029478 dated Dec. 15, 2016.

* cited by examiner

FIG. 2A

| Account Identifier | Content Item Identifier | Linked Accounts |
|---|---|---|
| 1 | 11, 12 | |
| 2 | 13 | |
| 3 | 14, 15, 16 | |

205 → (row 1), 210 → (row 2), 215 → (row 3)

FIG. 2B

| Account Identifier | Content Item Identifier | Linked Accounts |
|---|---|---|
| 1 | 11, 12 | 2, 3 |
| 2 | 13 | 1, 3 |
| 3 | 14, 15, 16 | 1, 2 |

205 → (row 1), 210 → (row 2), 215 → (row 3)

FIG. 2C

| Account Identifier | Content Item Identifier | Linked Accounts |
|---|---|---|
| 1 | 11, 12 | |
| 2 | 13 | 3 |
| 3 | 14, 15, 16 | 2 |

205 → (row 1), 210 → (row 2), 215 → (row 3)

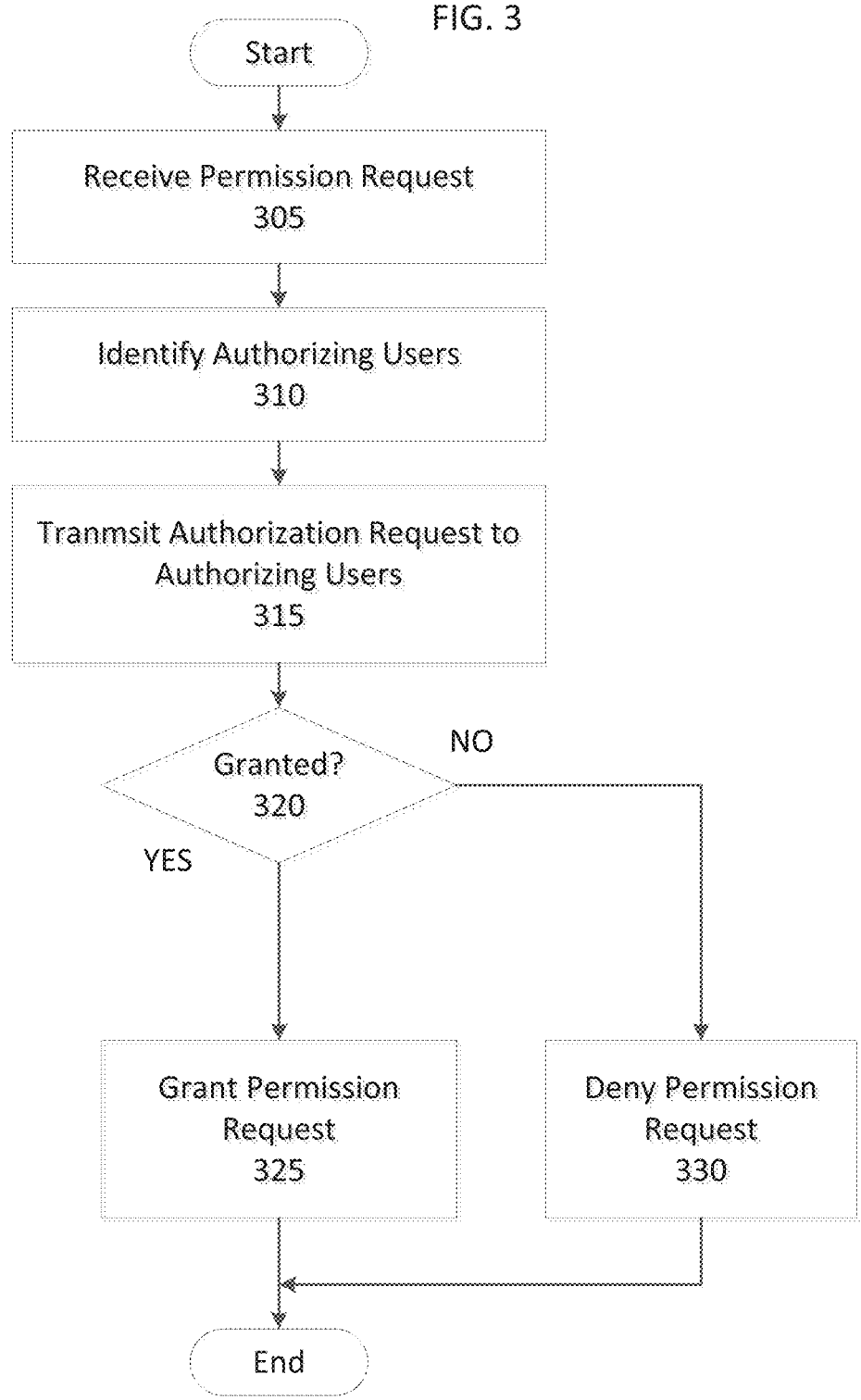

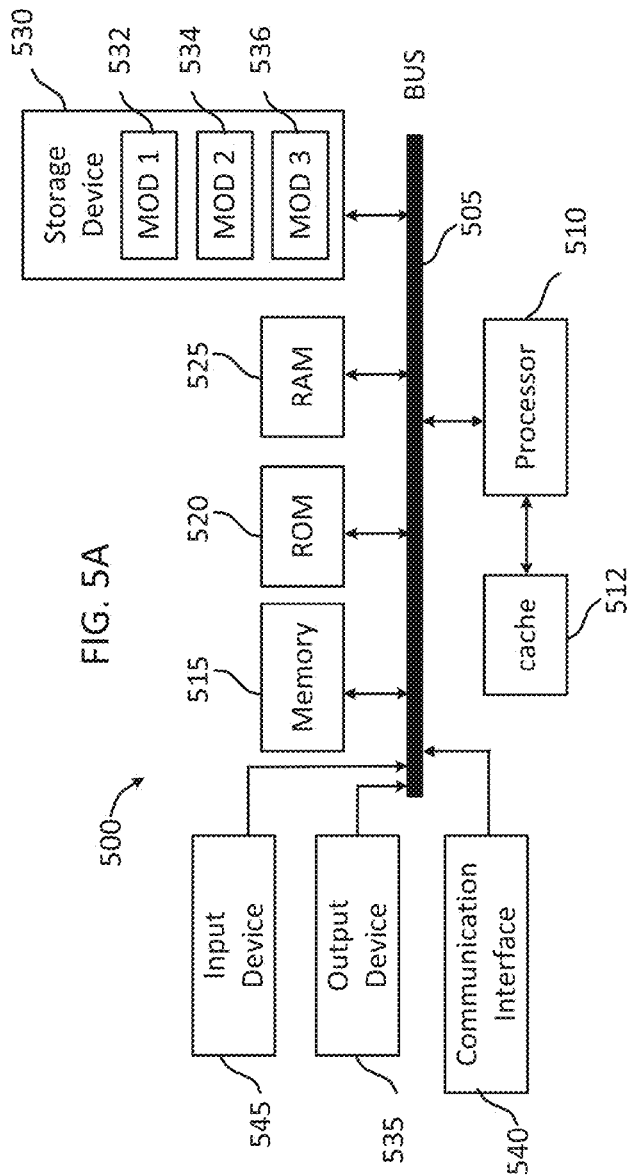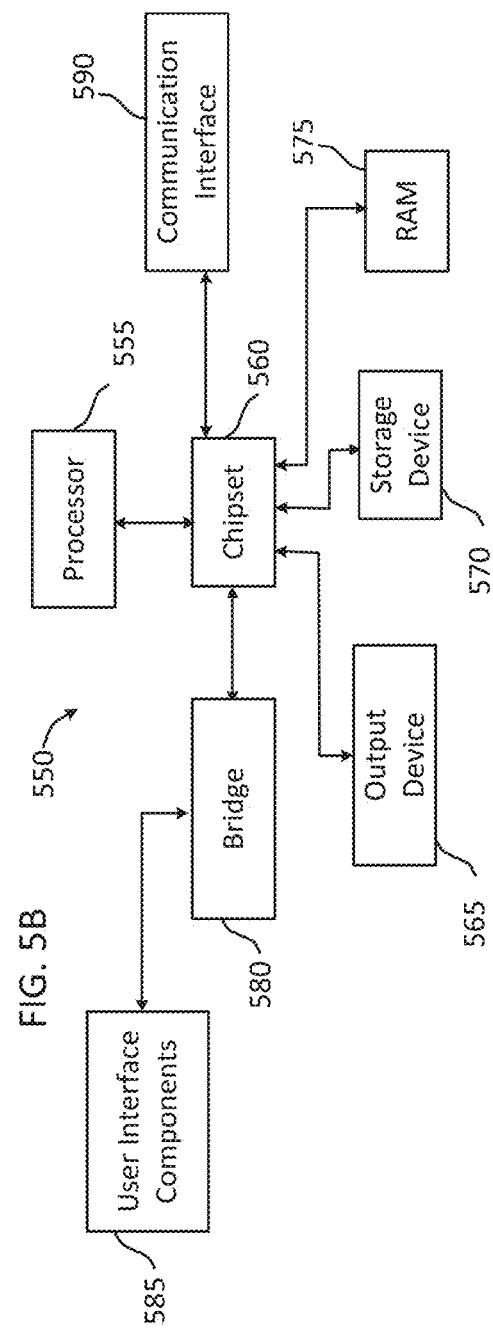

PERMISSION REQUEST

CROSS-REFERENCE TO RELATED APPLICATIONS

This application claims the benefit of U.S. Provisional Patent Application No. 62/005,187 entitled "PERMISSION REQUEST" filed on May 30, 2014, and U.S. Provisional Patent Application No. 62/005,180 entitled "CONTROL SETTINGS" filed on May 30, 2014, both of which are hereby expressly incorporated herein by reference in their entirety.

TECHNICAL FIELD

The present technology pertains to permission requests, and more specifically pertains to permission requests to perform a restricted action.

BACKGROUND

Computing devices have become a common part of daily life. For example, many families have a separate computing device for each family member. This can include desktop computers, laptops, smart phones, tablet PCs, etc. Along with the increased number of computing device, computing devices also allow users to perform a wider range of functionality. For example, computing devices can connect to the internet from multiple locations to access various types of content, such as video, music, images, etc.

Further, online stores allow users to purchase a variety of items from the comfort of their computing device. For example, online media stores allow users to purchase a variety of electronic content items such as music, movies, books, etc., which a user can access and perform from their computing device. Mobile computing devices, such as smart phones, allow users to send messages and make phone calls.

With this increase in the number of computing devices and functionality, managing and monitoring the use of computing devices has become much more difficult. For example, a parent cannot be with their child at all times to monitor the child's use of their computing devices and the content they are accessing. Current parental control systems require a parent to enter their password on their child's computing device to authorize a requested function. While this method provides parents with a way of restricting their child's use of their computing device, it is also cumbersome and requires that a parent and child be in close proximity. Accordingly, improvements are needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, devices, and non-transitory computer-readable storage media for managing permission requests from secondary user accounts. One or more user accounts can be linked together to form a group of linked user accounts. A designated primary user account in the group of linked user account can be enabled to modify control settings for the subordinate user accounts in the group of linked user account. The control settings can dictate restrictions on the subordinate user accounts. For example, the control settings can define restrictions on the type of content that can be accessed, purchases that can be made, storage space allocated to the subordinate user account, etc.

To perform a restricted action, such as access a restricted content item, a subordinate user account can transmit a permission request to an authorizing user account. The permission request can request authorization from the authorizing user account to perform the restricted action. The permission request can be transmitted to one or more client devices of the authorizing user account, and enable the authorizing user account to remotely select to approve or deny the permission request, thereby either granting or denying the subordinate user account from performing the restricted action.

In addition to approving or denying a permission request, an authorizing user account can also be enabled to ignore a permission request, thereby allowing the authorizing user account to respond to the permission request at a later time. Further, in some embodiments, an authorizing user account can select to deny all further permission requests to perform the restricted action.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 2A, 2B, and 2C illustrate an exemplary embodiment of linking multiple user accounts together;

FIG. 3 illustrates an exemplary method embodiment of requesting permission to perform a restricted action;

FIGS. 5A and 5B illustrate exemplary possible system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for managing permission requests from secondary user accounts. One or more user accounts can be linked together to form a group of linked user accounts. A designated primary user account in the group of linked user account can be enabled to modify control settings for the subordinate user accounts in the group of linked user account. The control settings can dictate restrictions on the subordinate user accounts. For example, the control settings can define restrictions on the type of content that can be accessed, purchases that can be made, storage space allocated to the subordinate user account, etc.

To perform a restricted action, such as access a restricted content item, a subordinate user account can transmit a permission request to an authorizing user account. The permission request can request authorization from the authorizing user account to perform the restricted action. The permission request can be transmitted to one or more client devices of the authorizing user account, and enable to the authorizing user account to remotely select to approve or deny the permission request, thereby either granting or denying the subordinate user account from performing the restricted action.

In addition to approving or denying a permission request, an authorizing user account can also be enabled to ignore a permission request, thereby allowing the authorizing user account to respond to the permission request at a later time. Further, in some embodiments, an authorizing user account can select to deny all further permission requests to perform the restricted action.

Figure 1:
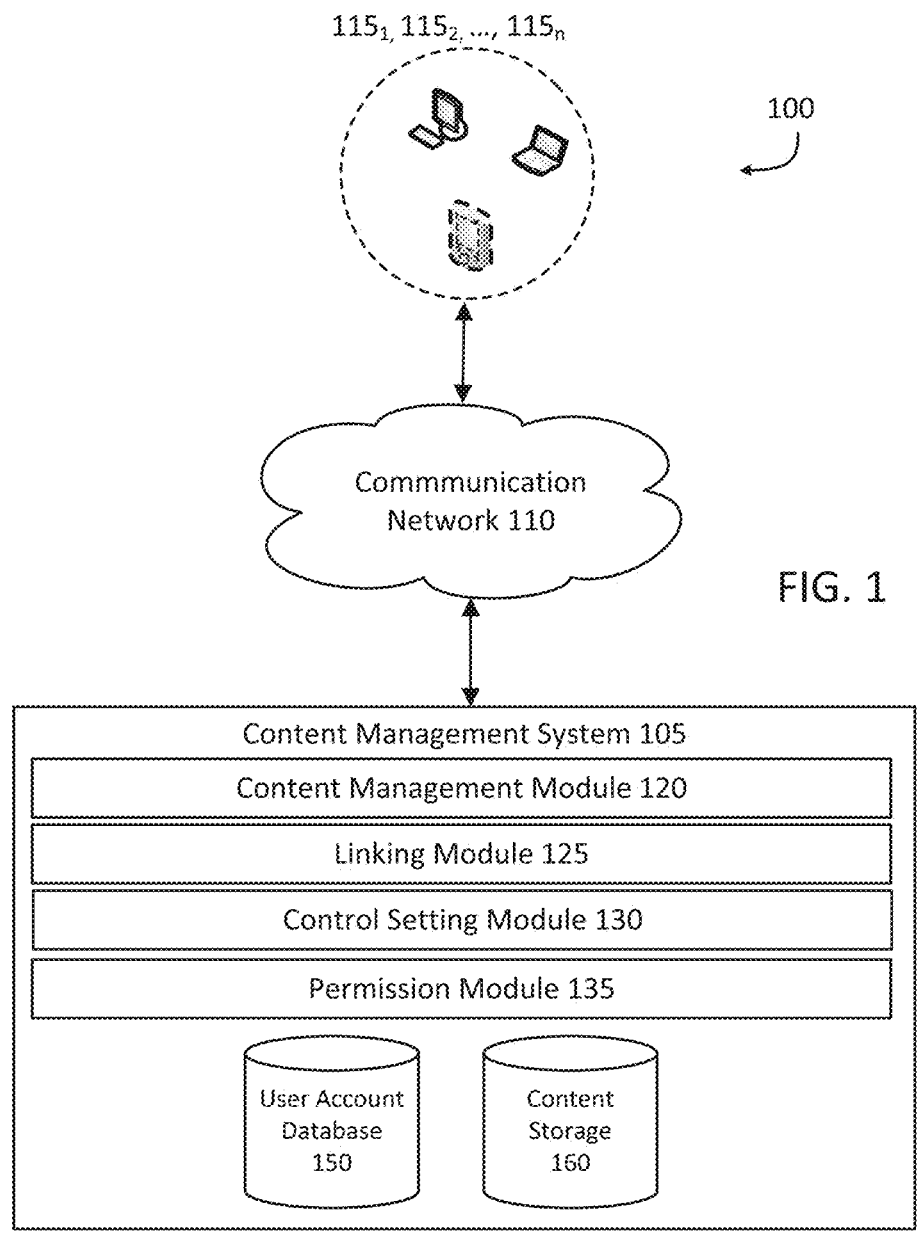
FIG. 1 illustrates an exemplary configuration of devices and a network in accordance with the invention.

FIG. 1 illustrates an exemplary system configuration 100, wherein electronic devices communicate via a network for purposes of exchanging content and other data. As illustrated, multiple computing devices (client devices 115 and content management system 105) can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communications links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 500 of FIGS. 5A and 5B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, a user can interact with content management system 105 through client devices $115_1$, $115_2$, . . . , $115_n$ (collectively "115") connected to communication network 110 by direct and/or indirect communication. Content management system 105 can support connections from a variety of different client devices 115, such as desktop computers; mobile computers; mobile communications devices, e.g. mobile phones, smart phones, tablets; smart televisions; set-top boxes; and/or any other network enabled computing devices. Client devices 115 can be of varying type, capabilities, operating systems, etc. Furthermore, content management system 105 can concurrently accept connections from and interact with multiple client devices 115.

A user can interact with content management system 105 via a client-side application installed on client device $115_i$. In some embodiments, the client-side application can include a content management system specific component. For example, the component can be a stand-alone application, one or more application plug-ins, and/or a browser extension. However, the user can also interact with content management system 105 via a third-party application, such as a web browser, that resides on client device $115_i$ and is configured to communicate with content management system 105. In either case, the client-side application can present a user interface (UI) for the user to interact with content management system 105. For example, the user can interact with the content management system 105 via a client-side application integrated with the file system or via a webpage displayed using a web browser application.

Content management system 105 can be configured to manage content items for multiple user accounts. For example, content management system 105 can allow users to purchase, store and access content items. Furthermore, content management system 105 can make it possible for a user to access the content items from multiple client devices 115. Accessing a content item can include receiving metadata describing the content item, streaming the content item from content management system $105_i$ downloading the content item or purchasing the content item.

To facilitate the various content management services, a user can create a user account with content management system 105. The account information for each created user account can be maintained in user account database 150. User account database 150 can store profile information for each user account, including a unique account identifier identifying the user account, personal information, username, password, email address, address, credit card information, banking information, client devices belonging to the user, etc. User account database 150 can also include account management information, such as content storage locations, security settings, personal configuration settings, client devices authorized to access the user account, etc.

A user account can be used to purchase, manage and store content items, such as digital data, documents, text files, audio files, video files, image files, etc. In some embodiments, a content item can be an item that is subject to a licensing restriction. For example, content management system 105 can provide an online content store where users can purchase a variety of content items. Further, in some embodiments, a user can upload content items from one of client devices 115 to content management system 105. The purchased and uploaded content items can be assigned to the user's user account and then accessed by the user from any of client devices 115 when logged into the user's user account. For example, a content item identifier identifying each content item assigned to a user account can be stored in user account database 150 and associated with the corresponding user account. The content item identifier can be used to identify the content item as well as the location of the content item.

The content items can be stored in content storage 160. Content storage 160 can be a storage device, multiple storage devices, or a server. Alternatively, content storage 160 can be a cloud storage provider or network storage accessible via one or more communications networks. Content management system 105 can hide the complexity and details from client devices 115 so that client devices 115 do not need to know exactly where the content items are being stored by content management system 105. Content management system 105 can store the content items in a network accessible storage (NAS) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various user accounts. The metadata for a content item can be stored as part of the content item or can be stored separately. In one variation, each content item stored in content storage 160 can be assigned a system-wide unique identifier.

Content management system 105 can include content management module 120 configured to manage and access each user account and the content items assigned to the user accounts. For example, content management module 120 can be configured to communicate with user account database 150 and content storage 160 to adjust privileges with respect to content items and otherwise manage content items.

A user can communicate with content management system 105 via client device $115_i$ to request to login into their user account. Content management system 105 can require that a user provide login credentials, such as a user name and password, to login into their user account. Upon receiving the correct login credentials for a user account, content management system 105 can authorize the requesting user's client device $115_i$ on the user account, thereby allowing client device $115_i$ to access content items assigned to the user account, make purchase with the payment method associated with the user account, assign content items to the user account, upload content items, etc.

In some embodiments, content management system 105 can limit the number of user accounts on which a client device 115 can be authorized at a time. For example, content management system 105 can limit a client device to being authorized on no more than one user account at a time. This can require a client device $115_i$ to log out of a user account prior to logging into a different user account, thereby authorizing the client device on the different user account.

While content management system 105 can be configured to limit client devices 115 to being authorized on only one user account at a time, content management system 105 can allow for multiple client devices 115 to be authorized on the same user account simultaneously. This can allow a user to access their user account from multiple devices, such as their tablet PC, desktop PC and smartphone.

Upon a user logging into their user account from client device $115_i$, thereby authorizing client device $115_i$ on their user account, content management module 120 can access the account information associated with the user account to identify the content items assigned to the user account, as well as account configuration data dictating presentation of the content items. Content management module 120 can then present and/or provide the content items to client device $115_i$ according to the account configuration data. For example, content management module 120 can access a user account to identify the content item identifiers assigned to the user account. The content item identifier can then be used to identify and locate the content items assigned to the user account, which can be transmitted to client device $115_i$, where they can be presented according to the account configuration data.

Presenting the content items can include transmitting metadata describing the content items to client device $105_i$ that is authorized on the user account. Client device $105_i$ can then use the received metadata to present the content items that the user account can access. For example, client device $105_i$ can present information identifying the content items in a content item library available to the user account. This can include presenting the title of the content item, an image such as an album or book cover, description, etc.

Content management module 120 can also assign content items to a user account. For example, upon a user purchasing or uploading a content item, content management module 120 can add a content item identifier identifying the purchased content item to the user account in account database 150, thus enabling the user account to access the content item.

In some embodiments, content management system 105 can be configured to link multiple user accounts together to form a group of linked user accounts so that content items assigned to each of the individual user accounts can be accessed by each of the user accounts in the group linked user account. This can allow family members to link their user accounts together to share their content items with each other, while maintaining their personal user account.

To link user accounts together, content management system 105 can include linking module 125. In some embodiments, linking module 125 can be configured to provide an account link interface that enables a user to link their user account to other user accounts. For example, the account link interface can enable a user to request that their user account be linked to another user account and/or accept a request received from another user account. Upon logging into their user account, a user can use the account link interface to link their user account to the user account of other users.

To link multiple user account together, linking module 125 can be configured to modify the account information of the linked user accounts to indicate that the user accounts are linked together. For example, in some embodiments, linking module 125 can modify a user account to include the unique account identifier of each user account linked to the user account. Account management module 120 can then access a user account to identify each of the user accounts linked to the user account. Likewise, to unlink a user account, linking module 125 can modify the user account of each linked user account to remove the unique account identifier of the user accounts that are no longer linked.

FIGS. 2A-2C illustrate an exemplary embodiment of linking multiple user accounts together. FIG. 2A, illustrates three user accounts: user account 205, user account 210 and user account 215. As shown, each user account (205, 210, 215) includes a unique account identifier field, a content item identifier field and a linked account field.

The unique account identifier field can include a unique account identifier that uniquely identifies a user account. As shown, the unique account identifier for user account 205 is 1; the unique account identifier for user account 210 is 2; and the unique account identifier for user account 215 is 3.

The content item identifier field can include content item identifiers identifying each content item assigned to the individual user account. As shown, content items 11 and 12 are assigned to user account 205, content item 13 is assigned to user account 210, and content items 14, 15 and 16 are assigned to user account 215.

The linked account field can identify the user accounts linked to a user account. For example, the linked account field can include the unique account identifier of each user account linked to the user account. As shown, none of the three user accounts (205, 210, 215) has a unique identifier in their respective linked account field, indicating that none of the user accounts (205, 210, 215) are linked to another user account. Each of the user accounts (205, 210, 215) can therefore access only the content items assigned to their respective user account. Thus user account 205 can access only content items 11 and 12, user account 210 can access only content item 13, and user account 215 can access only content items 14, 15 and 16.

FIG. 2B illustrates user accounts 205, 210 and 215 after they have been linked together to form a group of linked user accounts. As shown, user account 205 includes unique account identifiers 2 and 3 in the linked account field. This indicates that user account 205 is now linked to user accounts 210 and 215. Likewise, user account 210 includes the unique account identifiers 1 and 3 in its linked account field indicating that user account 210 is linked to user accounts 205 and 215, and user account 215 includes unique account identifiers 1 and 2 in its linked account field, indicating that user account 215 is linked to user accounts 205 and 210.

As a result of the user accounts 205, 210 and 215 being linked together, each of the user accounts (205, 210, 215) can access the content items assigned to the other user accounts, in addition to the content items assigned to the individual user account. For example, user account 205 can access content item 13 assigned to user account 210, and content items 14, 15 and 16 assigned to user account 215, in addition to the content items 11 and 12 assigned to user account 205. Likewise, user account 210 can access content items 11, 12, 14 15 and 16 in addition to the content items assigned to user account 210, and user account 215 can access content items 11, 12 and 13, in addition to the content items assigned to user account 215.

FIG. 2C illustrates user accounts 205, 210 and 215 after user account 205 has been removed from the group of linked user accounts. As shown, user account 215 no longer has any unique account identifiers listed in the linked account fields. This can indicate that user account 205 is no longer linked to any other user account. Further, the linked account fields of user accounts 210 and 215 have also been modified to remove the unique account identifier of user account 205, indicating that user accounts 210 and 215 are no longer linked to user account 205.

While user account 205 has been unlinked from user accounts 210 and 215, user accounts 210 and 215 remain linked to each other, as indicated by the linked account field of user accounts 210 and 215. As a result, user account 205 can access only the content items assigned to user account 205, and can no longer access the content items assigned to user accounts 210 and 215. Likewise, user accounts 210 and 215 can no longer access the content items assigned to user account 205, however user accounts 210 and 215 can still access the content items assigned to the other account. Thus, user account 205 can only access content items 11 and 12, whereas user accounts 210 and 215 can each access content items 13, 14, 15 and 16, but not content items 11 and 12.

Although listing unique account identifiers in a user account is used as one example of how user accounts can be linked together, this is only one possible embodiment and is not meant to be limiting. Linking multiple user account together can be performed in any of numerous ways known in the art.

In some embodiments, a unique group identifier can be used to identify a group of linked user accounts to which a user account belongs. A unique group identifier can identify one group of linked user accounts. Each user account can include a listing of unique group identifiers that identify each group of linked user accounts that include the user account belongs. A group index can be used to identify the user accounts included in each group of linked user accounts. For example, the group index can list each unique group identifier along with the unique account identifier for each user account included in the group. To identifying the user accounts linked to a user account, the user account can be accessed to gather the group identifiers associated with the account. The group identifiers can then be used to search the group index to identify the user accounts included in each group.

Returning to the discussion of FIG. 1, in some embodiments, one or more of the user accounts in a group of linked user accounts can be designated as a primary user account that can be enabled with additional functionality not provided to the subordinate user accounts in the group of linked user accounts. A subordinate user account can be a user account in the group of linked user account that is not designated as a primary user account.

In some embodiments, the user account used to create a group of linked user accounts can be designated the primary user account. Alternatively, a user account can be designated as the primary user account after the group of user accounts has been created; for example, after receiving authorization from the members of the group of linked user accounts that the user account should be the primary user account.

In some embodiments, the user account that provides the payment method used to make purchases for the group can be designated the primary user account. Alternatively, the user account designated the primary user account can be required to provide a valid payment method.

In some embodiments, a primary user account can be enabled to select and modify a payment method used by the group of linked user account, such as a credit or bank account that is used for all purchases. As another example, a primary user account can be enabled to add a user account to the group of linked user accounts and/or select to remove a user account from the group of linked user accounts.

In some embodiments, the primary user account can be enabled to set restrictions on the subordinate user accounts included in the group of linked user accounts. For example, content management system 105 can maintain control settings for each group of linked user accounts. The control settings for a group of linked user accounts can define restrictions on the individual user accounts in the group of linked user accounts.

In some embodiments, the control settings can be stored in a control setting index that can be a file assigned to a primary user account. For example, the control setting index can be stored in user account database 150 and associated with a primary user and/or the group of linked user accounts. This can provide the primary user account with read/write access to modify the control setting index and therefore modify the control settings. In contrast, the subordinate user accounts in the group of linked user accounts can be restricted to read only access to the control setting index, thereby restricting subordinate user accounts from modifying the control settings.

Content management system 105 can include control setting module 130 configured to enable a primary user account to modify the control settings and set restrictions on subordinate user accounts included in the group of linked user accounts. This can allow a parent to set restrictions on their child's user account.

Control setting module 130 can be configured to provide a control setting interface that enables the primary user account to modify the control settings for subordinate user accounts in the group of linked user accounts. For example, control setting interface 130 can communicate with user account database 150 to identify the subordinate user accounts linked to a primary user account, and then present the subordinate user accounts in the control setting interface, where the primary user account can set restrictions for the presented subordinate user accounts. Control setting module 130 can further be configured to access the control setting index to determine the current control settings for the group of linked user accounts.

The control setting interface can provide necessary tools to set the control settings for each subordinate user account. For example, the control setting interface can include buttons, dropdown menus, etc., that allow the primary user account to select and adjust the control settings for a subordinate user account. Control setting module 130 can record the selected control settings in the control setting index for the group of linked user accounts.

Upon receiving a request from client device $115_i$, content management system 105 can identify the user account authorized on client device $115_i$, (i.e. the user account that the client device 115 is logged into at the time the request is received), and access the control setting index for the corresponding group of linked user accounts. Content management system 105 can then determine whether the user account is restricted from performing the request. If content management system 105 determines that the request is restricted by the control settings, content management system 105 can deny the request. Alternatively, if content management system 105 determines from the control settings that the user account is not restricted from performing the request, content management system 105 can execute the request.

In some embodiments, the control setting index can be stored on client devices 115 as well as maintained by content management system 105. For example, control setting module 130 can transmit the control setting index to client devices 115 associated with the user accounts included in the group of linked user accounts. This can include client devices 115 authorized on a user account included in the group of linked user accounts. Client devices 115 can be configured to condition execution of requests based on the received control settings. For example, upon receiving a request, client device $115_i$ can determine from the received control settings whether the request is prohibited and, if so, deny the request. Alternatively, if the request is not prohibited, client device $115_i$ can execute the request.

Transmitting the control setting file to client devices 115 can allow the restrictions to be enforced while client devices 115 are not in network connection with content management system 105. For example, client device $115_i$ can have content items stored locally in memory on client device $115_i$. Maintaining the control setting index locally on client device $115_i$ allows client device $115_i$ to access the control setting index while a network connection with content management system 105 is not available. For example, if a user requests to access a local content item on client device 105, client device 105 can check the local control setting index to determine whether to grant access to the requested content item.

In some embodiments, client devices 115 can be required to receive approval from a primary user account prior to logging into a different user account. A child attempting to circumvent the restrictions placed on their subordinate user account can attempt to have a friend login to their unrestricted user account from the child's client device. Alternatively, the child can create a different user account that is not linked to the group of linked user accounts and therefore is not subject to the restrictions set by the primary user account. To prevent this, a client device $115_i$ that has been authorized on a subordinate user account of a group of linked user accounts can be required to receive approval from a primary user of the group of linked user accounts prior to allowing client device $115_i$ to login to a different user account. For example, client device $115_i$ can require that a primary user's login credentials be provided prior to permitting a user to log client device 115 into a different user account.

Control setting module 130 can enable the primary user account to set a variety of restrictions on a subordinate user account. For example, the primary user account can set restrictions on the types of content items that can be accessed, time spent on phone calls, time spent accessing content items, when actions can be performed, locations where actions can be performed, purchases, assigning content items, data used, calls made, etc. Further, in some embodiments, control setting module 130 can be configured to enable the primary user account to set restrictions on a client device 115 rather than a subordinate user account.

In some embodiments, content management system 105 can be configured to enable a primary user account to authorize a restricted action. For example, a parent may choose to allow their child to perform an action restricted by the control settings upon receiving the parent's approval. To accomplish this, content management system 105 can include permission module 135 configured to manage permission requests to perform a restricted action.

In some embodiments, permission module 135 can be configured to receive permission requests from client devices 115. A permission request can be a request to perform a restricted action. For example, a permission request can request permission to access a content item that a subordinate user account or client device 115 is restricted from accessing. As another example, a permission request can request permission to complete a purchase that the subordinate user account or client device 115 is restricted from completing.

Client devices 115 can be configured to enable a user to transmit a permission request to content management system 105 that requests permission to perform a restricted action. In some embodiments, client devices 115 can be configured to prompt a user to request permission upon determining that a user's request to perform an action is restricted by the control settings. Client device 115 can prompt the user to request permission to perform the restricted action, and provide a user interface element, such as a button that, upon selection, transmits a permission request to perform the requested action. Alternatively, in some embodiments, client devices 115 can be configured to determine which actions are restricted by the control settings and present the user with a user interface element configured to request permission to perform the restricted actions, rather than user interface elements to perform the restricted actions. For example, a user can be presented with a button to request permission to perform a restricted song rather than a button to perform the restricted song.

Further, in some embodiments, client device 115 can enable a user to enter a message to accompany the permission request. For example, a user may wish to enter a short explanation or plea as to why the user should be granted permission to perform the requested action. The entered message can be included in the permission request transmitted to content management system 105.

Upon receiving a permission request, permission module 135 can identify the user accounts enabled to authorize the requested action. For example, in some embodiments, only a primary user account in the group of linked user accounts can be enabled to authorize a permission request. Alternatively, in some embodiments, permission module 135 can enable a primary user account to enable other user accounts in the group of linked user accounts to authorize a permission request.

Permission module 135 can be configured to provide a permission interface that enables a primary user account to select permission request parameters for permission requests for the group of linked user accounts. This can include designating authorizing user accounts that can authorize a permission request, selecting the types of actions for which permission can be requested, etc. Permission module 135 can maintain permission request parameters in a permission request index associated with the group of linked user accounts.

In some embodiments, a primary user account can designate authorizing user accounts based on the type of action requested. For example, a parent may trust their oldest child to monitor the music accessed by their youngest child, but wish to maintain control of purchases that can be made by their youngest child. A parent can thus enable their oldest child's user account to authorize permission requests from their youngest child's user account that request permission to perform music, while requiring all permission requests to make a purchase to be authorized by the parent.

Upon receiving a permission request, permission module 135 can access the permission request index corresponding to the group of linked user accounts and identify the user accounts enabled to authorize the permission request. To accomplish this, permission module 135 can identify the user account and/or client device 115 from which the permission request was received and then identify the group of linked user accounts to which the user account and/or client belong.

Upon identifying the authorizing user accounts enabled to authorize a permission request, permission module 135 can transmit an authorization request to the authorizing user accounts. For example, permission module 135 can transmit the authorization request to client devices 115 that are authorized on the authorizing user accounts. Alternatively, in some embodiments, the permission settings can dictate a preferred contact method for the authorizing user accounts and permission module 135 can access the permission request index to determine the preferred contact method to transmit the authorization request to the authorizing user accounts.

An authorization request can be transmitted as any type of message known in the art. For example, an authorization request can be transmitted as a push notification, instant message, e-mail, phone call, text message, etc.

An authorization request can be a message indicating that a permission request to perform a specified action has been received. The authorization request can identify the requested action as well as the user account and/or client device 115 that requested permission to perform the requested action. Further, in some embodiments, the authorization request can include a message provided by the requesting user.

In some embodiments, an authorization request can be configured to enable an authorizing user to authorize and/or deny the permission request. For example, the authorization request can include user interface elements, such as a buttons, that enables the authorizing user to select to authorize and/or deny the permission request. An authorizing user can select the appropriate user interface element to authorize or deny the permission request.

Upon receiving a selection authorizing, denying, deferring the decision, etc., the user interface element can cause the authorizing user's client device 115 to transmit a message to content management system 105 indicating the authorizing user's selection. For example, client device 115 can transmit an authorization message indicating that the permission request has been approved. Alternatively, client device 115 can transmit a rejection message indication that the permission request has been denied.

In some embodiments, the content management system and/or client device 115 stores a record of decisions from the authorizing user's device 115. This record can be used to eliminate future requests for the same permission in the future. In some embodiments, this record can include a time to live (TTL) and after the TTL has expired the recorded decision becomes obsolete.

In response to receiving an authorization message, permission module 135 can grant the permission request. This can include executing the requested action. For example, in response to receiving an authorization message authorizing a permission request to access a content item, permission module can provide the requesting client device 115 access to the requested content item.

Alternatively, permission module 135 can transmit a message to the requesting client device 115$_i$ that the permission request has been approved. Client device 115$_i$ can then allow the requested action. In response to receiving a rejection message, permission module 135 can deny the permission request. This can include denying the requested action and/or notifying the requesting client device 115$_i$ to deny the requested action.

In some embodiments, permission module 135 can enable an authorizing user to ignore a permission request. Ignoring a permission request can cause the permission request to remain unanswered, thereby allowing an authorizing user to make a decision regarding the permission request at a later time. Permission module 135 can transmit an authorization request to an authorizing user's client device that allows the authorizing user to select to ignore the permission request. For example, the authorization request can include a user interface element, such as a button, enabling the authorizing user to ignore the permission request. Upon selection, the user interface element can cause the authorizing user's client device 115$_i$ to transmit an ignore message to content management system 105 indicating that the authorizing user has selected to ignore the permission request. Permission module 135 can maintain the ignored permission request as pending, thereby allowing the authorizing user to make a decision at a later time.

In some embodiments, permission module 135 can be configured transmit reminder messages to an authorizing user. For example, permission module 135 can transmit a reminder to an authorizing user regarding an ignored permission request and/or a permission request to which the authorizing user has not yet responded. In some embodiments, permission module 135 can transmit a reminder message based on a set schedule. For example, a reminder message can be sent every 10 minutes until a response has been received. Alternatively, in some embodiments, an authorizing user can select how reminder messages are to be transmitted to the authorizing user. For example, the authorizing user can select to receive a reminder message after 15 minutes.

In some embodiments, permission module 135 can be configured to deny a permission request after a specified amount of time has elapsed without receiving a response from an authorizing user. For example, permission module 135 can be configured to deny a permission request if a response has not been received within twenty minutes of transmitting an authorization request to an authorizing user.

In some embodiments, permission module 135 can be configured to restrict repetitive permission requests. For example, permission module 135 can be configured to automatically deny a repetitive permission request after the repetitive permission request has been received a predetermined number of times. A repetitive permission request can be a duplicate permission request received from a user account and/or client device 115 that requests permission to perform the same action as a previous permission request received from the user account and/or client device. Upon receiving a predetermined number of repetitive permission requests, permission module 135 can be configured to automatically deny further repetitive permission requests. Automatically denying a permission request can include denying the permission request without transmitting an authorization request to an authorizing user. Alternatively, in some embodiments, a requesting user account or client device 115 can be disabled from transmitting further repetitive permission requests.

In some embodiments, permission module 135 can be configured to enable an authorizing user to restrict further repetitive permission requests. For example, an authorization request can include a user interface element, such as a button or checkbox, that, when selected, causes future repetitive permission requests to be automatically rejected by content management system 105.

In some embodiments, permission module 135 can be configured to give priority to the first response received to an authorization request. For example, both a mother and father can be designated as authorizing users and so each would receive an authorization message in response to a permission request. Permission module 135 can be configured to give priority to the first response received, such that, if the mother responds first denying the permission request, the permission request will be denied, even if the father responds later authorizing the permission request.

Alternatively, in some embodiments, permission module 135 can be configured to wait for a response from each authorizing user and either grant or deny the permission request based on the responses received from each authorizing user. For example, permission module 135 can be configured to grant a permission request only if the permission request was granted by each authorizing user. Thus, if one authorizing user denied the permission request, then the permission module 135 will deny the permission request, even if another authorizing user granted the permission request.

In some embodiments, client devices 115 can be configured to communicate with each other directly to transmit permission requests, rather than use content management system 105 as an intermediary. For example, a permission request index can be maintained locally on client devices 115 and used to transmit a permission request. Upon a user of client device $115_i$ requesting permission to perform a restricted action, client device $115_i$ can access the local permission request index to identify the authorizing users that can authorize the permission request and transmit an authorization request to the authorizing users. Responses to the authorization request can be transmitted from an authorizing users client device $115_j$ to the requesting user's client device $115_i$.

FIG. 3 illustrates an exemplary method embodiment of requesting permission to perform a restricted action. As shown, the method begins at block 305 where a permission request is received. A permission request can be a request received from a user account in a group of linked user accounts that requests permission to perform an action that the user account is restricted from performing or, alternatively, does requires authorization to perform. For example, a permission request can be a request to make a purchase, play a movie, play a song, etc., that the user account is restricted from performing. Alternatively, a permission request can be a request to make a purchase using a payment method other than the payment method belonging to the requesting user account. For example, a child may request that his/her parent make a purchase for the child using the parent's payment method.

In some embodiments, the permission request can identify the requesting user account and the requested action. Further, the permission request can include a message provided by the requesting user.

At block 310, the authorizing user accounts that are authorized to respond to the permission request are identified. A permission request index associated with the group of linked user accounts can identify the user accounts designated as authorizing user accounts. The authorizing user accounts can be identified from the permission request index.

At block 315 an authorization request is transmitted to the authorizing users. An authorization request can be a request notifying the authorizing users that a permission request was received from a user account. The authorization request can identify the requested action and the requesting user and include a message provided by the requesting user. The authorization request can be configured to enable the authorizing user to select to either grant or deny the permission request. For example, the authorization request can include user interface elements that enable the authorizing user to make a selection to either grant or deny the permission request.

At block 320 it is determined whether the permission request was granted. For example, an authorization request can be received from an authorizing user indicating that the permission request was granted. Alternatively, a rejection message can be received from an authorizing user indicating that the permission request has been denied.

If at block 320 it is determined that the authorization request has been granted, the method continues to block 325 where the permission request is granted. This can include allowing the requesting user to perform the restricted action. For example, if a permission request requests permission to purchase a specific content item, granting the permission request can include executing the purchase request to purchase the specific content item. If at block 320 it is determined that the authorization request has not been granted, the method continues to block 330 where the permission request is denied.

In some embodiments, an authorizing user account can authorize a permission request from the requesting user's client device. For example, a requesting user's client device can present a permission interface that enables an authorizing user to authorize the permission request directly from the requesting user's client device. An authorizing user can provide their login credentials or other authorizing credentials to authorize the permission request. The requesting user's client device can communicate with the content management system to authenticate the received credentials.

Figure 4A:
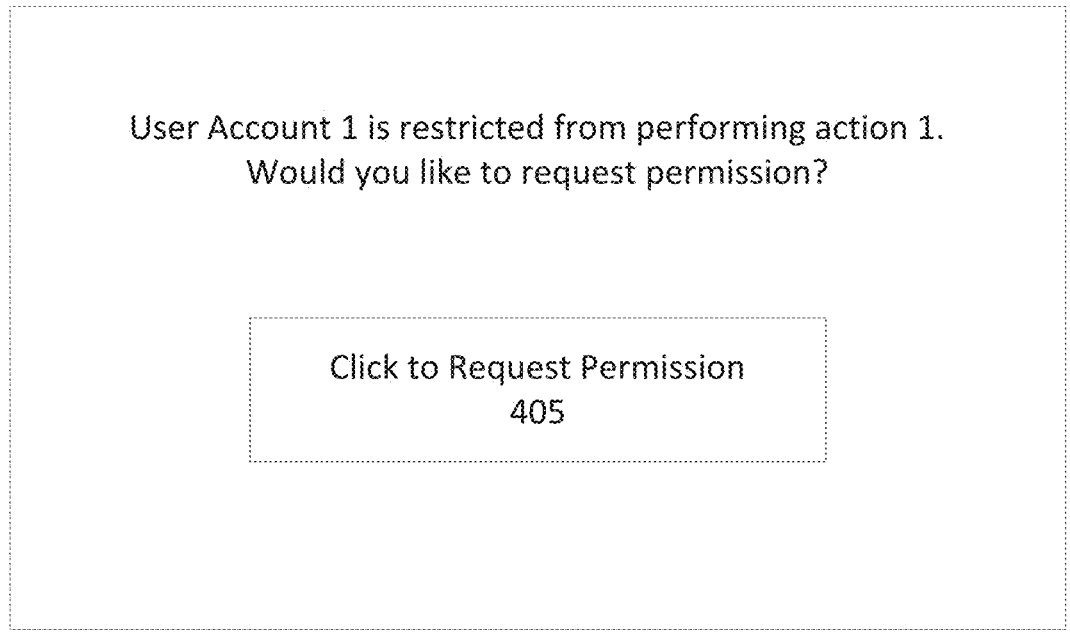
FIGS. 4A and 4B illustrate exemplary interfaces for requesting permission to perform a restricted action.
Figure 4B:
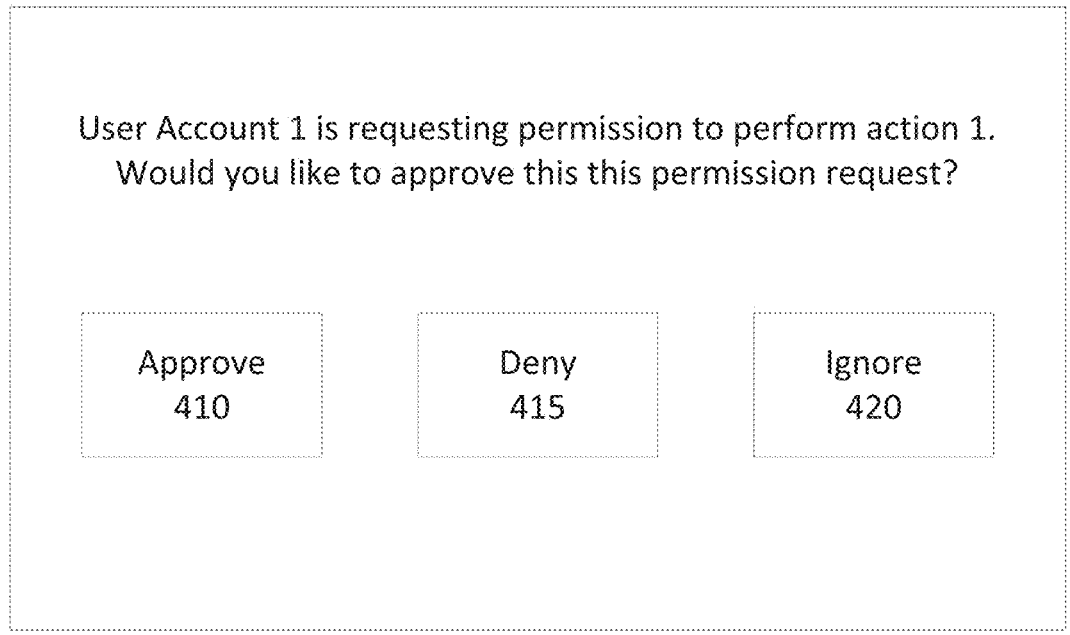

FIGS. 4A and 4B illustrate exemplary interfaces for requesting permission to perform a restricted action. As shown in FIG. 4A, a user can be notified that the requested action is restricted and requires authorization. The user can be presented with user interface element 405 that, when selected, initiates a permission request for the restricted action.

FIG. 4B shows an authorization request presented to an authorizing user. As shown the authorization request can identify the requesting user and the requested action. Further, the authorization request can include user interface element 410 that enables the authorizing user to approve the permission request, thereby allowing the requesting user to perform the restricted action. The authorization request can also include user interface element 415 that enables the authorizing user to deny the permission request, thereby restricting the requesting user from performing the restricted action. The authorization request can also include user interface element 420 that enables the authorizing user to ignore the permission request, thereby allowing the authorizing user to make a decision at a later time.

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
transmitting, by a computing device, to a first client device, a control setting file specifying restrictions to be enforced by the first client device while the first client device is logged into a first subordinate user account in a first group of linked user accounts;
receiving, by the computing device, a first permission request generated by the first client device while the first client device is logged into the first subordinate user account, wherein the first permission request requests permission for the first subordinate user account to access a first content item;
transmitting, by the computing device, a first authorization request to a second client device that is logged into a first authorizing user account associated with the first subordinate user account based on a determination that the first authorizing user account is associated with a request type of the first permission request, wherein the first authorization request requests permission for the first subordinate user account to access the first content item;
receiving, by the computing device, from the second client device, a first rejection message indicating that the first authorizing user account denies authorization for the first subordinate user account to access the first content item;
transmitting, by the computing device responsive to the first rejection message, a denial message to the first client device denying permission for the first subordinate user account to access to the first content item;
receiving, by the computing device, an account change request from the first client device, the account change request requesting to log the first client device into a second user account distinct from the first subordinate user account; and
transmitting, by the computing device responsive to the account change request, an account authorization request to a third client device logged into a second authorizing user account based on a determination that the second authorizing user account is associated with a request type of the account change request, wherein the account authorization request requests permission for the first client device to login to the second user account.

2. The method of claim 1, further comprising:
receiving, by the computing device, a second permission request generated by the first client device while the first client device is logged into the first subordinate user account, wherein the second permission request requests permission to access a second content item;
transmitting, by the computing device, a second authorization request to the second client device, wherein the second authorization request requests permission for the first subordinate user account to access the second content item;
receiving, by the computing device, a second rejection message from the second client device, the second rejection message indicating that further permission requests from the first subordinate user account to access the second content item should be denied; and
sending, from the computing device, an update to the first client device specifying that requests for the second content item should not be transmitted.

3. The method of claim 1, wherein a fourth user account that is a member of the first group of linked user accounts has a license for the first content item, wherein the fourth user account is distinct from the first subordinate user account and the first subordinate user account has a viewing right associated with the first content item based on the license and membership in the first group of linked user accounts.

4. The method of claim 1, wherein the first group of linked user accounts is associated with a group identifier, the group identifier being useable by the computing device to identify accounts included in the first group of linked user accounts based on a group index.

5. The method of claim 1, wherein the first content item is locally stored on the first client device at a time the first permission request is generated.

6. The method of claim 1, further comprising:
determining a plurality of user accounts, within the first group of linked user accounts, that are authorized to permit access to the first content item by the first subordinate user account.

7. The method of claim 6, wherein at least one user account of the plurality of user accounts is limited to permitting access to a particular type of content items.

8. The method of claim 1, further comprising:
receiving, by the computing device, an account change decision message from the second client device; and
allowing or refusing to allow, by the computing device, the first client device to login to the second user account based on the account change decision message.

9. The method of claim 1, wherein the first authorizing user account and the second authorizing user account are different accounts.

10. The method of claim 1, wherein the first authorizing user account corresponds to the second authorizing user account.

11. The method of claim 1, wherein the first authorizing user account is associated with authorizing content access requests and the second authorizing user account is associated with authorizing account change requests.

12. At least one non-transitory computer-readable medium comprising instructions stored thereon, the instructions effective to cause at least one computing device to:
store a group relationship including a first user account, a second user account, and a third user account, wherein the second user account is subordinate to the first user account, and wherein the group relationship indicates that the first user account is an authorizing user account for one or more first types of requests and that the third user account is an authorizing user account for one or more second types of requests;
transmit to a first client device, a control setting file specifying restrictions to be enforced by the first client device during use by the second user account;
receive a permission request from the second user account to access restricted content;
transmit, responsive to the permission request and a determination that a request type of the permission request is included in the one or more second types, a first authorization request to a second client device logged into the third user account, wherein the first authorization request requests permission for the second user account to access the restricted content;
receive, from the second client device, a first rejection message indicating that the third user account denies authorization for the second user account to access the restricted content; transmit, responsive to the first rejection message, a denial message to the first client device denying permission for the second user account to access the restricted content;
receive an account change request from the first client device, the account change request requesting to log the first client device into a fourth user account distinct from the second user account; and
transmit, responsive to the account change request and a determination that a request type of the account change request is included in the one or more first types, an account authorization request to a third client device logged into the first user account, wherein the account authorization request requests permission for the first client device to login to the fourth user account.

13. The at least one non-transitory computer-readable medium of claim 12, further including instructions effective to cause the at least one computing device to:
store the first rejection message;
receive a second permission request from the second user account to access the restricted content; and
transmit, based on the stored first rejection message, a second denial message to the first client device denying permission for the second user account to access the restricted content without querying the third user account.

14. The at least one non-transitory computer-readable medium of claim 12, wherein first user account, the second user account, and the third user account are included in a first group of linked user accounts, wherein at least one user account that is a member of the first group of linked user accounts has a license for the restricted content, and wherein the second user account has a viewing right associated with the restricted content based on the license and membership in the first group of linked user accounts.

15. The at least one non-transitory computer-readable medium of claim 14, wherein the first group of linked user accounts is associated with a group identifier, the group identifier being useable by the at least one computing device to identify accounts included in the first group of linked user accounts based on a group index.

16. The at least one non-transitory computer-readable medium of claim 12, wherein the restricted content is locally stored on the first client device at a time the permission request is generated.

17. The at least one non-transitory computer-readable medium of claim 14, wherein the instructions are further effective to cause the at least one computing device to:
determine user accounts within the first group of linked user accounts that are authorized to permit access to the restricted content by the second user account, wherein the user accounts within the first group of linked user accounts that are authorized to permit access include at least the first user account and the third user account.

18. The at least one non-transitory computer-readable medium of claim 17, wherein the third user account is authorized to permit access to the restricted content under conditions limited by the first user account, and wherein the conditions include a type of the restricted content.

19. An apparatus comprising:
one or more processors; and
one or more memory devices storing instructions executable by the one or more processors to:
store a group relationship including a first user account, a second user account, and a third user account, wherein the second user account is subordinate to the first user account, and wherein the group relationship indicates that the first user account is an authorizing user account for one or more first types of requests and that the third user account is an authorizing user account for one or more second types of requests;
transmit to a first client device, a control setting file specifying restrictions to be enforced by the first client device during use by the second user account;

receive a permission request from the second user account to access restricted content;

transmit, responsive to the permission request and a determination that a request type of the permission request is included in the one or more second types, a first authorization request to a second client device logged into the third user account, wherein the first authorization request requests permission for the second user account to access the restricted content;

receive, from the second client device, a first rejection message indicating that the third user account denies authorization for the second user account to access the restricted content; transmit, responsive to the first rejection message, a denial message to the first client device denying permission for the second user account to access the restricted content;

receive an account change request from the first client device, the account change request requesting to log the first client device into a fourth user account distinct from the second user account; and transmit, responsive to the account change request and a determination that a request type of the account change request is included in the one or more first types, an account authorization request to a third client device logged into the first user account, wherein the account authorization request requests permission for the first client device to login to the fourth user account.

* * * * *